United States Patent
Rehbein

(10) Patent No.: US 7,018,923 B2
(45) Date of Patent: Mar. 28, 2006

(54) COMPOSITE MATERIAL FOR PRODUCING AN ELECTRIC CONTACT SURFACE, IN ADDITION A METHOD FOR CREATING A LUBRICATED, CORROSION-FREE ELECTRIC CONTACT SURFACE

(75) Inventor: Peter Rehbein, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 20 days.

(21) Appl. No.: 10/485,228

(22) PCT Filed: Feb. 13, 2003

(86) PCT No.: PCT/DE03/00424

§ 371 (c)(1),
(2), (4) Date: Jun. 15, 2004

(87) PCT Pub. No.: WO03/102262

PCT Pub. Date: Dec. 11, 2003

(65) Prior Publication Data

US 2004/0241403 A1    Dec. 2, 2004

(30) Foreign Application Priority Data

Jun. 4, 2002    (DE) ................ 102 24 693

(51) Int. Cl.
*H01L 21/02*    (2006.01)
*B23K 26/20*    (2006.01)

(52) U.S. Cl. ............ 438/666; 219/121.66; 219/121.65; 439/886

(58) Field of Classification Search ................ 428/614, 428/615, 620, 621, 646, 539.5; 148/512, 148/565; 219/121.65, 121.66; 438/666
See application file for complete search history.

(56) References Cited

U.S. PATENT DOCUMENTS

| | | | |
|---|---|---|---|
| 3,620,839 A | | 11/1971 | Geckle et al. |
| 4,348,263 A | * | 9/1982 | Draper et al. .................. 205/50 |
| 4,495,255 A | * | 1/1985 | Draper et al. ................ 428/669 |
| 4,904,498 A | * | 2/1990 | Wu ............................ 427/556 |
| 5,002,899 A | * | 3/1991 | Geis et al. ................... 438/105 |
| 5,028,492 A | * | 7/1991 | Guenin ....................... 428/614 |
| 5,075,130 A | | 12/1991 | Reeber et al. |
| 5,141,702 A | * | 8/1992 | Guenin et al. .................. 419/8 |
| 5,667,659 A | * | 9/1997 | Souza et al. ................. 205/109 |
| 5,853,557 A | * | 12/1998 | Souza et al. ................. 205/109 |
| 5,916,695 A | * | 6/1999 | Fister et al. ................. 428/647 |
| 6,183,886 B1 | * | 2/2001 | Chen et al. .................. 428/647 |
| 6,254,979 B1 | * | 7/2001 | Drew et al. .................. 428/323 |
| 6,274,254 B1 | * | 8/2001 | Abys et al. .................. 428/670 |
| 6,350,326 B1 | | 2/2002 | McCay et al. |
| 6,565,983 B1 | * | 5/2003 | Arnell et al. ................. 428/469 |
| 6,878,461 B1 | * | 4/2005 | Kobayashi et al. .......... 428/614 |
| 6,881,784 B1 | * | 4/2005 | Cody et al. .................. 524/794 |

FOREIGN PATENT DOCUMENTS

| | | |
|---|---|---|
| FR | 2669846 A | 6/1992 |
| JP | 59232297 A | 12/1984 |

* cited by examiner

*Primary Examiner*—John J. Zimmerman
*Assistant Examiner*—Jason Savage
(74) *Attorney, Agent, or Firm*—Kenyon & Kenyon

(57) ABSTRACT

A modification of frictional state and surface condition of an electrical contact surface to reduce the insertion forces for establishment of an electrical plug connection and also to achieve protection from oxidation and fretting corrosion is provided. BY controlled melting of a contact surface that is applied onto a support material, a lubricant film applied onto the contact surface is diffused, by using a laser, substantially without modification into the liquefied contact surface and resolidified together with the latter, so that the lubricant film is incorporated into the contact surface.

6 Claims, 1 Drawing Sheet

COMPOSITE MATERIAL FOR PRODUCING AN ELECTRIC CONTACT SURFACE, IN ADDITION A METHOD FOR CREATING A LUBRICATED, CORROSION-FREE ELECTRIC CONTACT SURFACE

FIELD OF THE INVENTION

The present invention relates to a composite material for manufacturing an electrical contact area, comprising a support material and a contact surface applied on the support material, and to a method for producing a low-friction and low-corrosion electrical contact surface.

BACKGROUND INFORMATION

Contact areas are used to enable an electrical plug connection between a connector and mating connector, and to conduct current accordingly. In automotive applications in particular, tin, gold, or silver surfaces are used for the surfaces of the electrical contact areas. These are hot-galvanized or electroplated layers in the range of a few micrometers, which are applied onto a support material, for example a circuit board. The layers themselves have properties of deformability and good electrical conductivity.

At the interfaces to typical copper-based alloys, for example bronze, that often serve as the basic material for electrical plug connections, diffusion results in the formation of an intermediate layer that is made of intermetallic compounds, e.g. $Cu_3Sn$ or $Cu_6Sn_5$. This intermediate layer is harder, and can grow as a function of temperature.

Several other alloys based on the elements recited above may be found, for example SnPb, SnAg, SnAgCu, AuCu0.3.

Tin alloys, in particular, have low hardness and therefore also little wear resistance; as a result, frequent insertion/removal, or vehicle or engine-related vibrations can very easily cause the contact surface to be rubbed through, which in turn means that the plug connection has a tendency toward oxidation, i.e., so-called fretting corrosion. As a result of this rubthrough and/or the corresponding fretting corrosion, failures of important electrical components can cause disruptions to the operation of a motor vehicle.

Another disadvantage is that the aforementioned alloys have very high adhesion tendencies, so that the insertion forces that must be applied in order to establish an electrical plug connection are very high. The plastic deformation associated therewith is also too great for many applications. The adhesion can in fact cause the layer to be torn off or transferred, or to become chipped.

Similar processes can also occur with gold and silver surfaces if the contact surface is rubbed through and the material located beneath is correspondingly oxidized.

SUMMARY

It is an object of the invention to avoid the disadvantages of the existing art by creating a method and a material with which the insertion forces necessary for establishing an electrical plug connection are reduced, and the oxidation processes that occur are minimized.

The object is achieved by creating a composite material which is produced in such a way that a lubricant is incorporated into the contact surface.

By way of a modification of the frictional state and surface condition, the insertion forces for establishment of an electrical plug connection are reduced and the connection is protected from oxidation and fretting corrosion.

Lubricants having specific additives, for example perfluoropolyethers, ester oils, or similar materials, may achieve this effect. These additives are applied separately; this may entail a separate production step, metering control, preparation of the oil, etc. Lubricant incorporation, on the other hand, namely the "freezing" of microscopic oil dispersions into the contact surface, yields the advantage that lubricant molecules are made available at the contact points experiencing wear, so that the desired properties are achieved.

A further advantage of the invention is the fact that by way of a partial treatment, individual contact regions can be specifically treated.

By selecting a suitable material, it is possible to ensure that only a brief melting of the surface is produced, in particular, as a result of the laser treatment, using a Nd:YAG laser, for example. During this melting operation, the lubricant that had previously wetted the surface to be treated diffuses into the contact surface. Switching off the laser causes the contact surface to solidify again to assume almost its original state. The lubricant molecules themselves become embedded in the fluid structure, however, and the fluid structure solidifies together with the melted surface, so that a portion of the lubricant is embedded (incorporated) within the contact surface.

The excellent slip property ensures that as a result of the insertion operation, the connector slides along the slide contact and does not remove material at the very first insertion operation and thus provoke corresponding corrosion.

DETAILED DESCRIPTION

Figure 1:
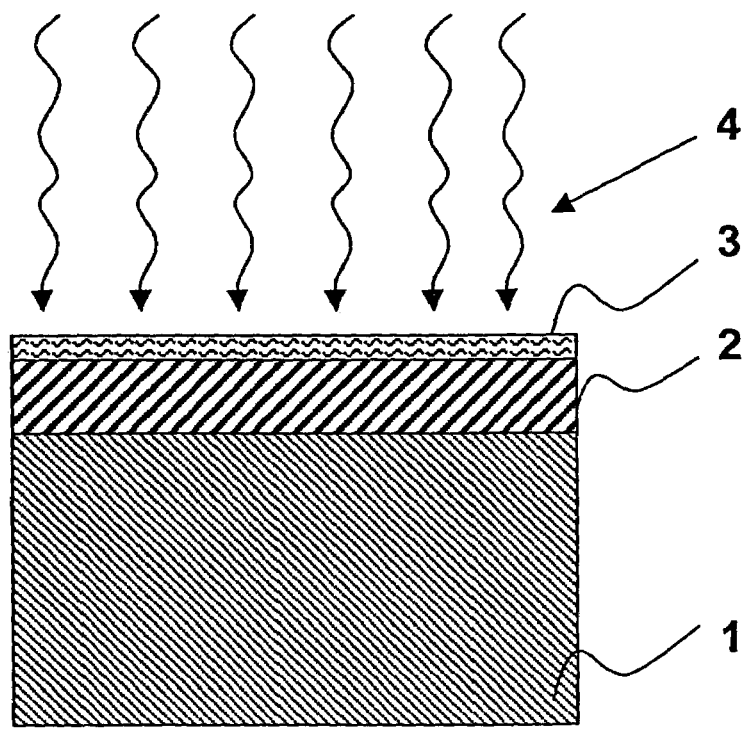
FIG. 1 shows a schematic view of a first method step of the method according to an example embodiment of the present invention.

FIG. 1 depicts a support material 1 on which a contact surface 2, which may include, for example, tin, is applied.

Figure 2:
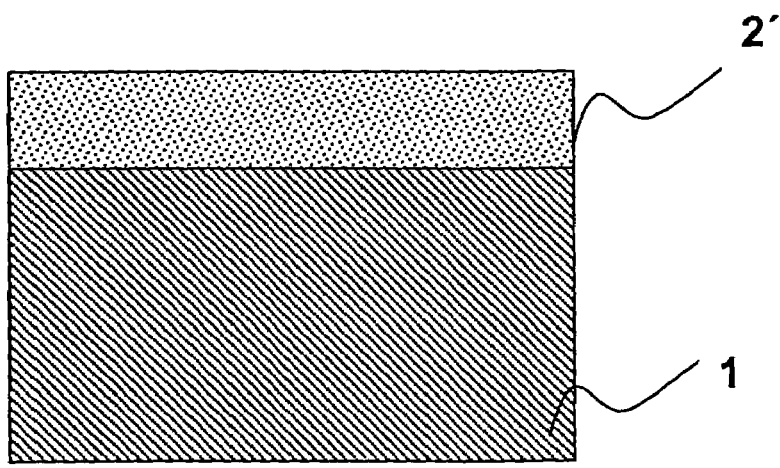
FIG. 2 shows a schematic view of the method according to an example embodiment of the present invention after completion of the first and second processing procedure.

Prior to the actual processing procedure for producing a low-friction, low-corrosion electrical contact surface 2' (as shown in FIG. 2), contact surface 2 is equipped with a lubricant film 3. As an alternative to this, provision is made for immersing support material 1, together with contact surface 2, into a bath.

Brief melting of the contact surface is accomplished, in the example embodiment depicted here, by way of a pulsed laser, such as a Nd:YAG laser. The corresponding light waves 4 are depicted schematically in FIG. 1. The light waves of the pulsed laser penetrate through lubricant film 3 almost without modification, and melt contact surface 2. Temperatures between 200 and 400° C. are achieved and liquify the metallic contact surface 2; as a result of this aggregate state, lubricant film 3 penetrates into the almost-liquid contact surface 2 and mixes with it.

As a result of the pulsing (power level, duration) of the Nd:YAG laser, which is to be adapted to the coating material, the melting occurs in controlled fashion, so that immediately after the end of the corresponding pulses, contact surface 2 solidifies together with the lubricant already diffused into the liquid contact surface, and the corresponding situation as shown in FIG. 2 is thus achieved. The new contact surface 2' on support material 1 thus corresponds to a micro- or nanodispersion of metallic layer and lubricant.

What is claimed is:

1. A method for producing a low-friction and low-corrosion electrical contact surface, comprising:
   applying a lubricant film onto the contact surface, thereby wetting the contact surface; and
   briefly melting the contact surface, the brief melting causing the lubricant film to be incorporated, substantially without modification, into the contact surface;
   wherein the contact surface solidifies after the brief melting.

2. The method as recited in claim 1, wherein a laser is used to briefly melt the contact surface.

3. The method as recited in claim 2, wherein the lubricant film is an oil dispersion.

4. The method as recited in claim 2, wherein the lubricant includes additives.

5. The method as recited in claim 2, wherein the laser is a Nd:YAG laser.

6. The method as recited in claim 5, wherein the laser is pulsed.

* * * * *

UNITED STATES PATENT AND TRADEMARK OFFICE
CERTIFICATE OF CORRECTION

| | | |
|---|---|---|
| PATENT NO. | : 7,018,923 B2 | Page 1 of 1 |
| APPLICATION NO. | : 10/485228 | |
| DATED | : March 28, 2006 | |
| INVENTOR(S) | : Peter Rehbein | |

It is certified that error appears in the above-identified patent and that said Letters Patent is hereby corrected as shown below:

Column 1, line 33, change "AuCuO.3." to --$AuCuO_3$.--

Signed and Sealed this

Nineteenth Day of December, 2006

JON W. DUDAS
*Director of the United States Patent and Trademark Office*